United States Patent [19]

Koppens

[11] 4,001,363

[45] Jan. 4, 1977

[54] METHOD OF MANUFACTURING A CERAMIC FERROMAGNETIC OBJECT

[75] Inventor: Leonardus Josephus Koppens, Eindhoven, Netherlands

[73] Assignee: U.S. Philips Corporation, New York, N.Y.

[22] Filed: Sept. 13, 1974

[21] Appl. No.: 505,656

Related U.S. Application Data

[63] Continuation of Ser. No. 117,355, Feb. 22, 1971, abandoned.

[30] Foreign Application Priority Data

Mar. 19, 1970 Netherlands ............... 7003901

[52] U.S. Cl. ................... 264/61; 252/62.51; 264/DIG. 58
[51] Int. Cl.² ............................... C04B 35/26
[58] Field of Search ............ 264/61, DIG. 58; 252/62.54, 62.51, 62.64

[56] References Cited

UNITED STATES PATENTS

| | | | |
|---|---|---|---|
| 2,962,445 | 11/1960 | Pierrot et al. | 252/62.58 |
| 3,184,807 | 5/1965 | Schornstheimer | 264/61 |
| 3,197,334 | 7/1965 | Wode | 264/61 |
| 3,404,026 | 10/1968 | Skudera | 264/61 |
| 3,558,354 | 1/1971 | Lindquist et al. | 264/61 |
| 3,778,307 | 12/1973 | Beer | 117/221 |

*Primary Examiner*—Donald J. Arnold
*Assistant Examiner*—John Parrish
*Attorney, Agent, or Firm*—Frank R. Trifari; Carl P. Steinhauser

[57] ABSTRACT

A method of manufacturing a formed, ferromagnetic object, particularly an annular memory core, in which a quantity of ferrite powder, a ferrite sol and a polymerized, organic compound are mixed to form an aqueous solution, which is poured out in a thin layer. A solid, elastic gel is formed, from which rings can be punched, which, after sintering, can be used as cores for memories.

5 Claims, 3 Drawing Figures

METHOD OF MANUFACTURING A CERAMIC FERROMAGNETIC OBJECT

This is a continuation, of application Serial No. 117,355, filed Feb. 22, 1971 now abandoned.

The invention relates to a method of manufacturing a ceramic ferromagnetic object, in which a mixture of a ferromagnetic powder, a binder and a suitable solvent is applied in a thin layer to a substrate, from which thin layer ferromagnetic objects of the desired shape and dimensions can be made subsequent to drying.

The ceramic, ferromagnetic objects referred to in the present application may be annular ferrite cores for use in storage devices, ferrite core parts for magnetic heads, magnetic ferrite or garnet films, and, in general, all ferromagnetic elements employed in the art and made from a foil or tape of a ferromagnetic powder and a binder.

It is known to use for the production of such foils or tapes organic binders and organic solvents. U.S. Pat. No. 3,411,202, for example, refers in this connection to polyvinylbutyral and polyvinylacetate-polyvinylchloride as binders and to methylethylketone and a mixture of toluene and ethanol as solvents, while German Pat. No. 1,185,741 mentions, nitrocellulose resins such as pyroxiline as binders in combination with amylacetate as a solvent, alkyd resins as binders in combination with toluene as a solvent and polyvinylalcohol as a binder in combination with water as a solvent.

In the known methods the solidification of the foil results from the evaporation of the solvent. It is a disadvantage that the foils thus formed are sometimes thicker at the edges than at the center, whilst the thickness of the foil depends upon the potential evaporation of the solvent employed so that foils of a thickness of more than 150 $\mu$ can be manufactured only with great difficulty or cannot be manufactured at all.

It is a further disadvantage that punching of annular memory elements from foils manufactured in a conventional manner frequently involves the effect that during punching the foil is first compressed, that the slicer subsequently penetrates over a small distance into the foil, after which compression occurs again, which phenomena may be repeated several times. This may result in cracks in the rings.

Punched annular magnet cores are usually preheated at a temperature of 300° in order to remove the binder. The preheated product is then sintered at a temperature of at least 1100° C. Since in the conventional method an appreciable quantity (about 20%) of organic substances as binders or softeners are employed, so that subsequent to sintering pores may be left in the product, the final product usually does not exhibit optimum density.

The invention provides a method not involving the aforesaid disadvantages, or exhibiting the same to an at least considerably reduced extent.

The method according to the invention is characterized in that a quantity of ferro-magnetic powder, a sol containing one or more metal hydroxides and/or metal oxyhydroxides and a polymerized organic compound or a combination of such compounds are mixed to obtain an aqueous suspension so that a gel is formed, which is subsequently dried.

It is known that under given conditions sols gelate in an aqueous medium. The OH-groups of the water molecules are attracted by the charged sol particles so that a water sheath is formed. If these water sheaths are sufficiently large, they can form a jelly-like aglomeration. Experiments have shown that even a small concentration of a sol spontaneously gelates when a polymerized, water-soluble, organic compound is added. A mixture of 2% ferro-hydroxide sol and 3% of polyvinylalcohol in an aqueous solution is found to gelate spontaneously.

It is found that the addition of polymerized organic compounds such as methylcellulose, polyvinylpyrolidone and polyethylene oxide to a sol also gives rise to gelation. It should be noted that in particular the addition of polyvinylalcohol to a sol gives rise to the formation of a very solid, elastic gel. Such a gel can be successfully used in accordance with the invention as a binder for forming various objects of the basis of ferromagnetic powders, for example, for drawing foils, for rolling or for extrusion.

In a preferred form of the method according to the invention the aqueous suspension contains, as a polymerized, organic compound, at least polyvinylalcohol.

A further advantage of the use of the elastic gel described above as a binder for the manufacture of foils, for example, for annular storage elements resides in that punching of the rings from the foil does not or substantially not involve the aforesaid disadvantageous effect.

It should be noted that the properties of the gel formed in accordance with the invention may be slightly modified by combining the polyvinylalcohol with other polymerized, organic compounds. In this way particularly the solidity (workability) and the time of gelatin can be acted upon.

In a preferred form of the method embodying the invention the aqueous suspension contains a metal hydroxide and/or metal oxyhydroxide(s) comprising sol, the content of metal hydroxide(s) and/or metal oxyhydroxide(s) of the suspension being up to 20%, up to 12% by weight of polymerized, organic compound(s) and a remainder of ferromagnetic powder.

The aqueous suspension contains preferably a sol of such a composition that the content of the liquid of metal hydroxide(s) and/or metal oxyhydroxide(s) is from 2 to 10% of the content of ferrite powder.

It is found that a binder having a composition of the sol lying between said limits permits manufacturing foils having a higher density and better mechanical properties than the foils manufactured in the conventional manner.

The method embodying the invention is particularly suitable for the production of foils or tapes of ferrite, from which rings are punched which, after sintering, can be used as cores in memories. The ferromagnetic powder is then formed by a ferrite powder and in accordance with the invention a sol is employed of which the ratio of the quantities of metal is equal to that in the ferrite. For such a sol the term "ferrite sol" will be used hereinafter, while the expression "a 5% ferrite sol" is to be understood to mean: a sol having such a composition that the content of metal hydroxide(s) and/or metal oxyhydroxide(s) of the liquid in which the sol is suspended is 5% of the content of ferrite powder suspended in the liquid.

In a preferred form of the method according to the invention the ferromagnetic powder therefore has the composition:

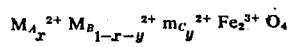

while the sol has the composition:

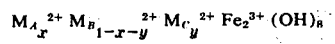

wherein $M_A M_B M_C$ are bivalent metals or bivalent metallic complexes and wherein $0 \leq x \leq 1, 0 \leq y \leq 1, x + y \leq 1$.

In a further form of the method embodying the invention a ferrite sol is produced as follows: To an aqueous solution of $FeCl_3$ is added an excess quantity of concentrated ammonia and to the resultant precipitation, subsequent to filtering and washing, are added nitrates of the metals $M_A$, $M_B$ and/or $M_C$ until the desired composition in which the ratio of the quantities of metal is equal to that in the ferrite is attained, after which concentrated $HNO_3$ is added until the sol is formed.

It should be noted that the clearness of the liquid is indicative of the progress of formation of the sol. When the sol is formed, the pH of the solution appears to be 3.1 or slightly lower.

In a further preferred form of the method embodying the invention $M_A$ represents Cu or Mg, $M_B$ represents Mn and $M_C$ is Co or Ni.

The invention furthermore relates to a formed, ferromagnetic body manufactured by anyone of the preceding methods.

According to a first aspect such a body, particularly, a magnet core, is characterized in that in the sintered state it consists of particles, the size of which lies between 0.5 and 12 $\mu$, while about 90% of the particles has a size lying between 4 and 8 $\mu$. It has been found that when using a binder containing a 2–10% ferrite sol, and preferably a 4–6% ferrite sol, the sintered final product exhibits a very small variation in particle size, a particularly smaller variation than in the products manufactured in the conventional manner.

According to a second aspect such a body, particularly consisting of Cu-Mn-Ni-ferrite, is characterized in that in the sintered state the density exceeds 90% of the X-ray density. It has been found that by mixing a binder in accordance with the invention containing a 2–10% ferrite sol with a powder consisting of Cu-Mn-Ni-ferrite the density of the product obtained after drying and sintering exceeds 90% of X-ray density. For example, starting from an aqeuous suspension containing apart from Cu-Mn-Ni-ferrite powder, a 9.2% ferrite sol and 9.4% of polyvinylalcohol (calculated on the basis of percentages by weight of quantities of dry substance added to the liquid) and after gelation and sintering, a product having a density of 4.73 was obtained. The X-ray density of the material concerned is 5.1, whereas the final density of the product manufactured in the conventional manner usually does not exceed 4.3.

It was a surprise to find not only that foils manufactured by the method according to the invention exhibit the above-mentioned satisfactory mechanical properties but also that magnet cores obtained from such foils by punching and sintering have very satisfactory magnetic properties, which are particularly superior to those of annular memory cores made from foils produced by the conventional manner. It has been found that with an annular memory core made from a foil having a thickness of 120 $\mu$ and being manufactured by using a 5% ferrite sol, the outer diameter being 550 $\mu$ (20 mil) after punching the quotient $$\frac{UV_1}{wV_2} = 5,6 \text{ and } t_p = 0.14 \ \mu sec.$$

The invention will be explained more fully with reference to the following Examples:

EXAMPLE I

A ferrite powder of the composition $Cu_{0.11}Ni_{0.16}Mn_{1.02}Fe_{1.78}O_4$, obtained by means of the spray dry method and having an average particle size of 0.1 micron and containing substantially no particles smaller than $\pm 0.05$ micron and substantially no particles larger than $\pm 0.2$ micron in uniform distribution, was worked up with a polyvinylalcohol (PVA) binder in accordance with the invention to a foil of a thickness of 120 $\mu$. The ferrite sol was produced as follows: to a solution of $FeCl_3$ in water was added an excess quantity of concentrated ammonia, and subsequent to filtering and washing, the resultant deposit had added to it $Cu(NO_3)_2$, $Ni(NO_3)_2$ and $Mn(NO_3)_2$ until the desired ferrite composition was attained and concentrated $HNO_3$ was added to a pH value of 3.1.

This PVA-ferrite sol mixture was mixed with the ferrite powder and a thin layer of the resultant mixture was poured out into a thin layer thickness approximately 120 microns on a mylar carrier. This layer was dried at room temperature for about one hour. In order to loosen the formed foil from the carrier, the assembly was put in acetone for a short time (1 minute) so that at the same time the drying process was accelerated.

From the following Table it will be apparent to what extent the density of the foil prior to and after sintering in air for 15 minutes at a temperature of 1250° C (green density and final density respectively) depends upon the quantities used of polyvinylalcohol and ferrite sol (% sol denoting the content of metal hydroxide(s) and/or metal oxyhydroxide(s) present in sol form in the suspension used).

| % PVA | % sol | green density | final density |
| --- | --- | --- | --- |
| 3.51 | 1.21 | 2.04 | 3.86 |
| 3.48 | 1.95 | 2.21 | 4.16 |
| 3.46 | 2.49 | 2.33 | 4.33 |
| 3.44 | 3.04 | 2.36 | 4.37 |
| 3.40 | 4.17 | 2.21 | 4.00 |
| 3.34 | 5.72 | 2.39 | 4.25 |
| 3.18 | 8.90 | 2.74 | 4.63 |
| 4.80 | 1.87 | 2.23 | 4.10 |
| 4.74 | 2.75 | 2.46 | 4.53 |
| 4.72 | 3.23 | 2.50 | 4.58 |
| 4.66 | 4.20 | 2.50 | 4.50 |
| 4.57 | 6.15 | 2.61 | 4.54 |
| 4.33 | 11.10 | 2.77 | 4.43 |
| 5.94 | — | 1.97 | 3.78 |
| 5.91 | 0.75 | 2.09 | 3.84 |
| 5.85 | 1.74 | 2.20 | 4.00 |
| 5.81 | 2.34 | 2.35 | 4.16 |
| 5.77 | 3.45 | 2.46 | 4.36 |
| 5.80 | 3.02 | 2.53 | 4.50 |
| 5.74 | 4.12 | 2.49 | 4.39 |
| 5.61 | 6.0 | 2.80 | 4.57 |
| 5.53 | 7.26 | 2.88 | 4.52 |
| 5.33 | 9.93 | 2.94 | 4.50 |
| 6.90 | — | 2.04 | 3.86 |
| 6.77 | 2.04 | 2.22 | 4.02 |
| 6.67 | 3.02 | 2.44 | 4.32 |
| 6.62 | 4.11 | 2.38 | 4.05 |
| 6.50 | 5.47 | 5.52 | 4.06 |
| 6.46 | 6.53 | 2.94 | 4.56 |
| 6.40 | 7.60 | 3.06 | 4.65 |
| 9.16 | — | 2.15 | 3.92 |
| 9.08 | 2.02 | 2.14 | 3.72 |
| 9.00 | 3.02 | 2.26 | 3.84 |
| 8.86 | 4.46 | 2.29 | 3.87 |

-continued

| % PVA | % sol | green density | final density |
|---|---|---|---|
| 8.50 | 8.38 | 2.94 | 4.73 |
| 8.06 | 12.72 | 2.72 | 4.38 |
| 12.03 | — | 2.52 | 4.32 |
| 11.80 | 1.91 | 2.22 | 3.60 |
| 11.68 | 3.00 | 2.38 | 3.81 |
| 11.50 | 4.26 | 2.42 | 3.82 |
| 11.15 | 7.26 | 2.57 | 3.98 |
| 11.01 | 8.51 | 2.65 | 4.01 |

From the Table, it appears that in a large number of cases the final density is considerably higher than the maximum final density of 4.3 attained in foils produced in the conventional manner. The maximum final density of a foil produced in accordance with the invention is 4.73. The percentage of polyvinylalcohol is 8.50, so it appears that an appreciably lower quantity of organic substance (for an optimum density 8.50%) is used than in the conventional method (about 20%).

EXAMPLE II

From a foil produced in the same manner as described in Example I, the ferrite being, however, MgMn ferrite, rings were punched with an outer diameter of 550 $\mu$ (20 mil), an inner diameter of 340 $\mu$ (13 mil) and a height of 120 $\mu$. These rings were preheated at a temperature of 100° C and subsequently sintered in air at a temperature of 1250° C for 1–60 minutes. They were then heated at a temperature of 980° for 10 minutes and finally cooled in air. The ferrite rings thus obtained had an outer diameter of 430 $\mu$, an inner diameter of 270 $\mu$ and a height of 100 $\mu$.

Pulse characteristic curves of the ferrite rings were measured at 40° C, the maximum value of the control-current intensity being 750 mA, the disturbance ratio being 0.61, the rise time being 50 nsec and the pulse duration being 150 nsec.

The measured results are explained more fully with reference to the drawing, the symbols used having the following meanings:

$uV_1$ the maximum value of the output voltage of the undisturbed 1-signal $wV_2$ the maximum value of the output voltage of the disturbed 0-signal $t_p$ the peak time, i.e., the time elapsing between the instant at which the control-current intensity, while rising attains the value of 10% of its maximum value and the instant at which the output voltage of the disturbed 1-signal attains its maximum value ($rV_1$).

FIG. 1 shows to what extent the measured dynamic rectangularity $$\frac{uV_1}{wV_z}$$

depends upon the average grain size $\bar{d}$ for various sol concentrations.

depends upon the composition $C_s$ of the sol used. $C_s =$ 5% means in this connection that the content of metal hydroxide(s) and/or metal oxyhydroxide(s) in sol form in 5% of the content of ferrite powder used.

Figure 1:
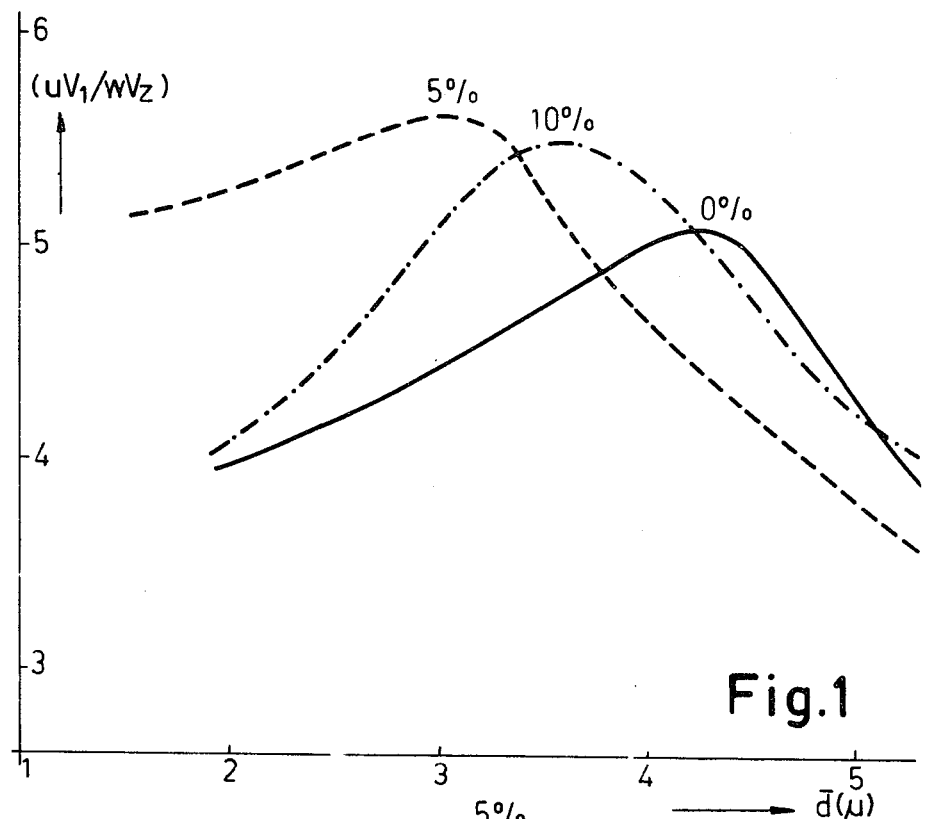

From FIG. 1 it will be apparent that if, as in the conventional method, no ferrite sol (0%) is used in the binder the value of the dynamic rectangularity $uV_1/wV_z$ is at a maximum with an average granular size $\bar{d}$ of about 4.2 $\mu$. Various annular memory cores each having another average grain size were made by varying the sintering time at an uncharged sintering temperature. It appears that the use of a 5 and a 10% ferrite sol in the binder yields a higher value of the dynamic rectangularity. The highest value, which is about 20% higher than in the conventional method, is attained by the use of a 5% ferrite sol. This value is attained with an average grain size which is about 30% smaller.

Figure 2:
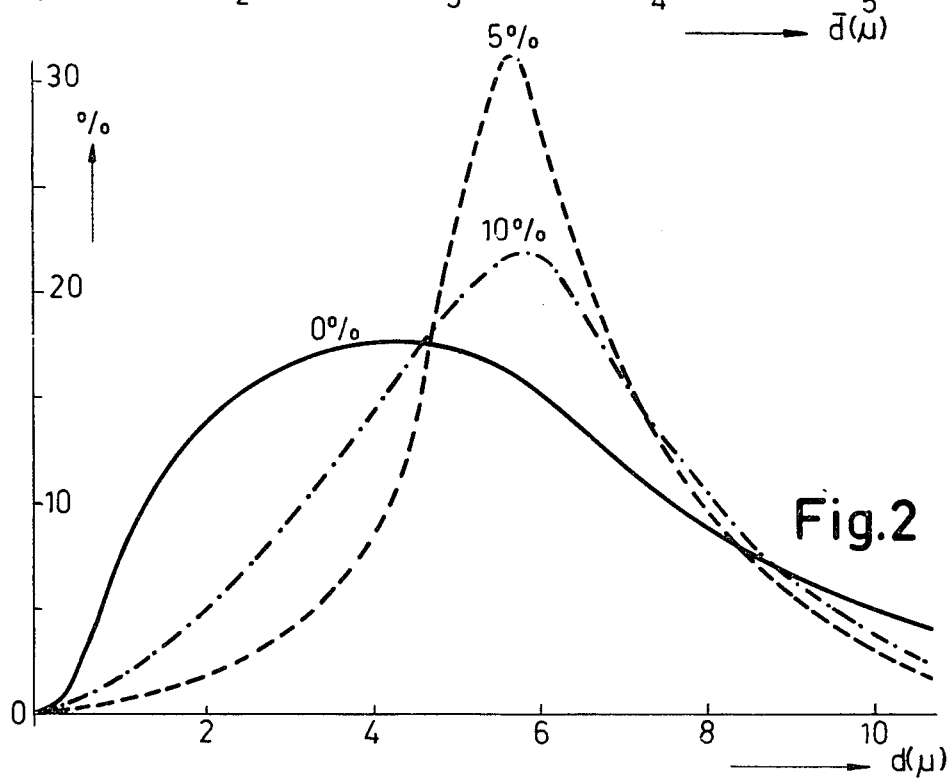
FIG. 2 shows the stray in grain size $\bar{d}$ with the use of different sol concentrations.

It will be appreciated from FIG. 2 that the divergency grain size $\bar{d}$ of the sintered product depends upon the ferrite sol added to the binder. If no ferrite sol is added the divergency in grain size is considerable. The use of a 10% and particularly of a 5% ferrite sol appears to give rise to a considerable slighter stray. A comparison of FIG. 1 to FIG. 2 proves that the highest value of the dynamic rectangularity is attained when the divergency in grain size is at a minimum (with the use of a 5% ferrite sol).

Figure 3:
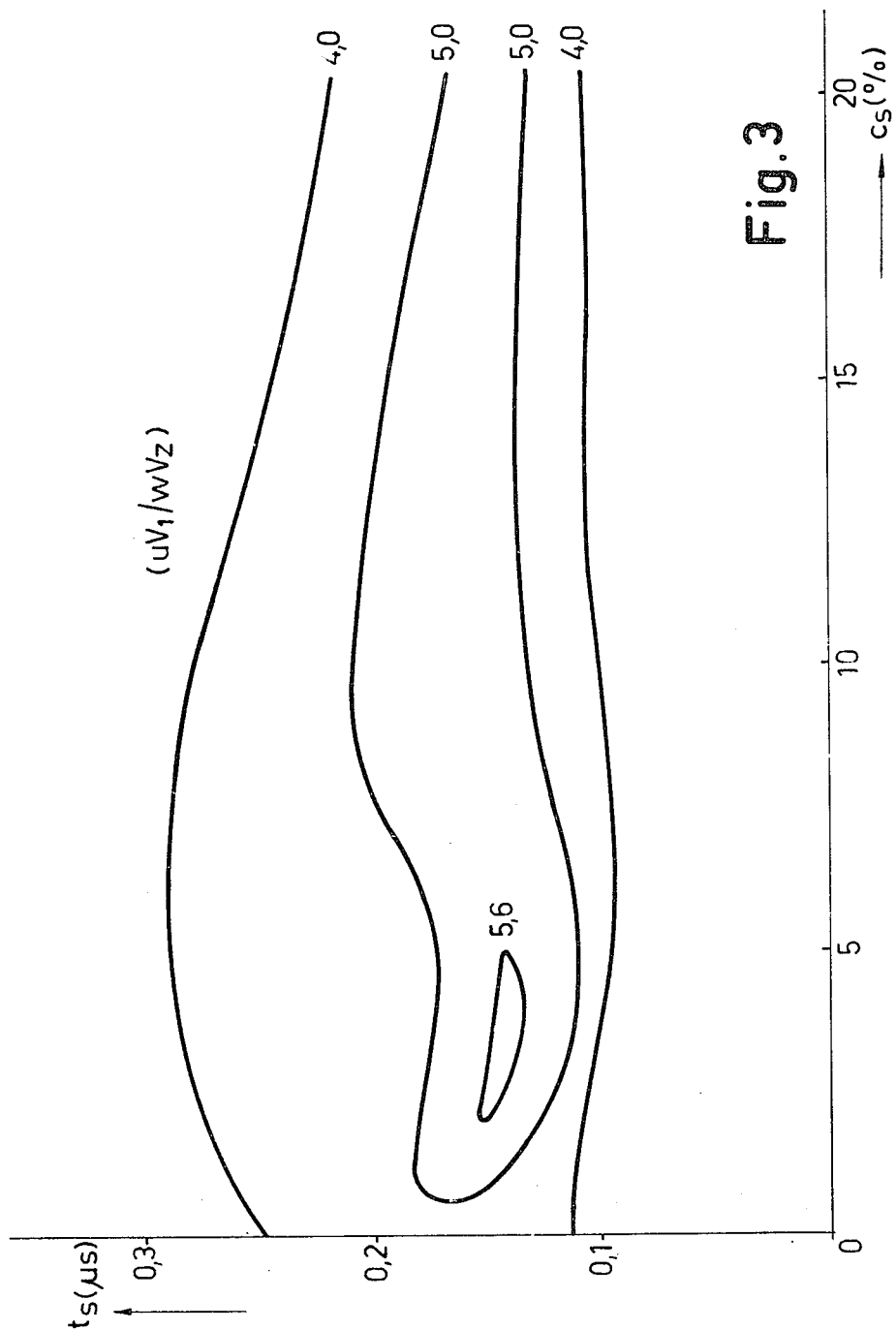
FIG. 3 shows to what extent the peak time $t_p$ for different values of the dynamic rectangularly $$\frac{uV_1}{wV_z}$$

From FIG. 3 it is apparent that in general with the same dynamic rectangularity $uV_1/wV_z$ the peak time $t_p$ is shorter when the binder contains a ferrite sol. It appers in particular that with $uV_1/wV_z = 5.6$, $t_p$ lies between 0.15 and 0.13 $\mu$sec with the use of a 2 to 5% ferrite sol in the binder. With $uV_{21}/wV_z = 5$, $t_p$ is at a minimum with the use of a 4.5% ferrite sol. With $uV_1/wV_z = 4$, $t_p$ is at a minimum with the use of a 6% ferrite sol.

What is claimed is:

1. A method of manufacturing ferromagnetic objects, comprising the steps of forming an aqueous suspension comprising the combination of a ferromagnetic powder having the composition $M_{A_x}^{2+} M_{B_{1-x-y}}^{2+} M_{C_y}^{2+} Fe_2^{3+} O_4$, a sol having the composition $M_{A_x}^{2+} M_{B_{1-x-y}}^{2+} M_{C_y}^{2+} Fe_2^{3+} (OH)_8$, wherein $M_A$, $M_B$, or $M_C$ are bivalent metals or bivalent metal complexes, and wherein:

$0 \leq x \leq 1$
$0 \leq y \leq 1$
$x + y \leq 1$ and a polymerized organic compound, applying said suspension to a substrate, drying said suspension to form a layer on said substrate, forming objects of desired shape and dimensions from said layer, and heating said objects to eliminate said polymerized organic compound, convert said sol to the ferromagnetic powder, and form coherent bodies of said ferromagnetic powder.

2. A method as claimed in claim 1 wherein the sol composition constitutes up to 20% by weight and the polymerized organic compound up to 12% by weight of the aqueous suspension.

3. A method as claimed in claim 2 wherein the sol composition is from 2 to 10% by weight of the ferromagnetic powder.

4. A method as claimed in claim 1 in which the sol is formed by adding an excess quantity of ammonia to an aqueous solution of Fe Cl₃ to form a precipitate to which quantities of nitrates of the metals $M_A$, $M_B$, and $M_C$ are added in ratios corresponding to those in the ferromagnetic powder, and thereafter adding $HNO_3$ to form the sol.

5. A method as claimed in claim 4 in which $M_A$ is an element selected from the group consisting of Cu and Mg, $M_B$ is Mn, and $M_C$ is an element selected from the group consisting of Co and Ni.

* * * * *